Patented Feb. 17, 1948

2,436,239

UNITED STATES PATENT OFFICE 2,436,239

METHOD OF PREPARING CASEIN ADHESIVES

Samuel M. Weisberg and Edwin G. Stimpson, Baltimore, Md., assignors, by mesne assignments, to National Dairy Research Laboratories, Inc., New York, N. Y., a corporation of Delaware No Drawing. Application October 1, 1941, Serial No. 413,162

6 Claims. (Cl. 106—146)

1

The present invention relates to adhesives and more particularly to casein adhesives of controlled viscosity and adhesion which are suitable for securing, for example, linoleum to walls, for use in the manufacture of plywood, for sizings for fabrics and felts and for many other purposes.

Casein adhesives have long been used in many industries, but are known to have certain disadvantages such as instability and relatively uncontrolled adhesive properties.

The control of the stability of casein has been a problem of long-standing and many attempts have been made to stabilize casein dispersions and to regulate their viscosity in order to render them more suitable for various industrial purposes. For example, it is known that acids or acid salts when dried with casein will produce dispersions of lowered viscosity. Moreover, similar processes utilizing fluorine-containing mineral acids have been used for the treatment of casein. In general, the methods heretofore used require some sort of chemical addition to effect the desired control of the viscosity of the product. Such added chemicals cause no fundamental change in the casein molecule and the adhesive properties of such chemically treated casein products may or may not be correlated with a change in viscosity.

It has also been suggested that casein mixtures may be digested by enzymes to produce dispersions of a desired viscosity. Always the enzymes have been used in the treatment of relatively dilute dispersions or solutions of casein, such as, for example, those used in preparing casein paints and the like. With such solutions, little difficulty is encountered in bringing the enzyme into contact with the casein molecules because of their low concentration and, as a result a fairly uniform action is obtained on the casein particles. However, it has not been possible, heretofore, to treat concentrated casein dispersions or solutions of the type required for adhesives with enzymes because of the difficulties encountered in producing a uniform product having the desired adhesive properties.

In accordance with the present invention, we have provided a method of treating casein solutions of a sufficiently high concentration to be used as adhesives in such a way as to control the adhesive properties of the dispersion.

An object of the present invention is, accordingly, to provide a process of treating casein solutions or dispersions to improve their adhesive properties.

2

Another object of the invention is to provide stable casein solutions or dispersions by treatment with enzymes so that the characteristics of the dispersions, such as viscosity and adhesive properties, will remain constant over long periods of time.

Other objects of the invention will become apparent from the following detailed description of typical processes and products embodying the present invention.

In general, the process embodying the present invention includes the dispersion of a casein solution of relatively high concentration by means of an alkali and then allowing an enzyme to act upon the dispersion at a temperature best adapted for the maximum action of such an enzyme and for a period of time sufficient to produce the desired adhesive properties. The enzyme may be inactivated by means of a suitable heat treatment in order to stop its action when the desired characteristics of adhesion and viscosity are obtained. If desired, a suitable preservative can be added so that decomposition will not take place and the dispersion further stabilized by the addition of an untreated casein dispersion.

The addition of an untreated casein dispersion to the enzyme treated casein dispersion appears to stabilize the entire mixture apparently for the reason that the untreated casein molecules act as a protective colloid. In any event, it has been found that this mixture of treated and untreated molecules, even when the untreated molecules are present in as little as 5% of the total casein present imparts amazing stability to the mixture.

Preferably the concentration of casein used in accordance with the present invention is between 30 and 40% since it has been found that the best adhesives are produced when such concentrations are used. However, the process is applicable to the treatment of casein solutions of concentrations as high as 50% or even higher since the determining factor in the successful use of the process is the intimate contact between the enzyme and the casein particles in the dispersion.

The enzymes found suitable for the degradation of the protein molecules are those which are active in alkaline or neutral solution, such as, for example, pancreatin, trypsin and other proteolytic enzymes. Such enzymes as papain and pepsin which are active only in an acid media, are not suitable since it is not possible to produce a suitable casein dispersion under acid conditions.

In accordance with the present invention, the casein may be of any of the usual types, such as muriatic, sulphuric, lactic or rennet casein. These caseins may be dispersed with many of the known types of alkali compounds which have been used heretofore in producing casein dispersions. For example, such alkalis and alkali salts as potassium hydroxide, sodium fluoride, sodium carbonate, sodium bicarbonate, sodium hydroxide, ammonia, borax, water soluble hydroxy amines, such as the ethanol-amines, are effective in dispersing the casein.

A typical process for preparing casein adhesives of the type embodying the invention is as follows: To make a 100 pound batch of the adhesive, 37 pounds of casein of any of the above types are mixed with 29 pounds, 7 ounces of cold water for about five minutes and allowed to stand without mixing for about fifteen minutes. 6 pounds, 9 ounces of borax are suspended in 24 pounds of cold water and then added to the wetted casein. The mixture is then violently agitated in a jacketed mixer and hot water at about 190° F. is passed through the mixer jacket. The batch is thoroughly mixed until it is homogenous and has attained a temperature of about 145° F.

When the batch is thoroughly mixed, cold water is passed through the jacket while the mixer is still running until a temperature of about 118° F. is reached. The water temperature is then raised to about 84° F. so as to give the casein dispersion a temperature of about 115° F. The batch is then stirred at 115° F. for about 30 minutes. The prolonged mixing of the casein dispersion together with heating during mixing assures the uniform distribution of the casein throughout dispersion and eliminates any lumpy particles so that the enzyme can act uniformly on the casein.

A mixture containing about 67 grams of trypsin dissolved in 3 pounds of water and which has been allowed to stand for one-half hour is added to the casein dispersion and mixed with continuous stirring at 115° F. for the desired time. This time may be between about one-half hour and an hour, depending upon the final characteristics of the product desired. Mixing for a period of 45 minutes has been found to produce a product of excellent adhesive properties and a suitable viscosity for application of the adhesive. The continued mixing of the enzyme and the casein dispersion assure uniform distribution of the enzyme throughout the dispersion and an uniform action on the casein particles.

At the end of the period of digestion of the dispersion by the enzyme, water at about 200° F. is passed through the jacket until the mixture reaches a temperature of about 170° F. or above. The dispersion is held at this temperature for about 30 minutes in order to inactivate the enzyme. If desired, at this time a suitable preservative, such as, for example, "Dowicide B" may be added to the solution. The mixture is then stirred and cold water is run through the jacket of the kettle until the temperature of the batch is decreased to about 140° F.

The resulting product has novel characteristics which distinguish it sharply from prior enzyme or chemically treated casein products. For example, our products are semi-solid or plastic masses in which the water present is bound to the casein. A mass of a typical product when placed on absorbent paper, such as a paper towel, will not wet the paper through. The viscosity of the product determined by the MacMichael viscosimeter will vary between 300 and 600° at 28° C. using a 1 cm. diameter plunger on a #26 torsion wire with the container for the casein rotated at 7 revolutions per minute.

As contrasted with our product, other enzyme-treated caseins, such as those prepared in accordance with the disclosure of the United States patent to Oberg, No. 2,246,983, issued June 24, 1941, which were tested under the conditions indicated above have a viscosity of 1.5 degrees MacMichael. Thus, while the prior casein dispersions are normally highly fluid, our products at normal temperatures have a body such that they may be applied with a trowel or spatula to the surfaces to be joined.

The viscosity and the adhesive properties of the casein dispersion can be modified by varying the concentration of the casein dispersion and, moreover, by varying the length of time during which the enzyme acts upon the casein. The more extended the period of action upon the casein, the less the viscosity of the resulting mixture.

The stability of the product is reasonably satisfactory as regards viscosity and adhesion, but these characteristics can be greatly improved by blending an untreated casein dispersion, prepared as described above, with the enzyme-treated casein. The proportions of the enzyme-treated casein and casein not treated with the enzyme can be varied considerably, for example, the untreated casein may be as much as 50% of the total casein in the dispersion, or as little as 5%, this amount being sufficient, in many instances, to greatly increase the stability of the dispersion.

The efficacy of our treated casein dispersions for such purposes as gluing linoleum to walls has been clearly established and the use of our adhesives in many fields where casein adhesives have been used before is advantageous. The dispersions of the present invention have exactly the correct degree of adhesiveness and contraction under changes of temperature so that when applied to plaster surfaces, the plaster will not be cracked or broken loose by the adhesive. Our adhesives are characterized by a high degree of fluidity at elevated temperatures and, therefore, are extremely useful under conditions wherein high temperatures are required for satisfactory application.

It will be understood that we have produced a novel and extremely convenient type of casein adhesive and one which has a stability far superior to that of casein adhesives heretofore known.

It should be understood that the above-described typical embodiment of the invention is illustrative only, and that there may be considerable variation in the concentration of the casein dispersion prepared initially, the amount of the enzyme used and the temperatures involved in preparing the dispersion, the temperature at which the enzyme activity takes place due to the characteristics of the enzyme and the temperatures used for inactivating the enzyme. Therefore, the embodiment of the invention described above should not be considered as limiting the scope of the following claims.

We claim:

1. A method of preparing adhesives comprising heating and agitating a mixture of casein and water to about 145° F. in the presence of an alkaline compound to produce a homogeneous dispersion containing at least 30% casein, cooling said dispersion, mixing with said dispersion a proteolytic enzyme which is active in alkaline or neutral solution, agitating said dispersion for a predetermined period of time at a temperature suitable for activity of said enzyme, and subsequently heating said enzyme to render it inactive.

2. A method of preparing adhesives comprising heating and agitating a mixture of casein and water to about 145° F. in the presence of an alkaline compound to produce a homogeneous dispersion containing at least 30% casein, cooling said dispersion to about 115° F., adding to said dispersion a proteolytic enzyme which is active in alkaline or neutral solution, agitating said dispersion for between about one-half hour and 1 hour while maintaining said dispersion at a temperature suitable for enzyme activity, and then heating said dispersion to inactivate said enzyme.

3. A method of preparing adhesives comprising heating and agitating a mixture of casein and water to about 145° F. in the presence of an alkaline compound to produce a homogeneous dispersion containing at least 30% casein, cooling said dispersion to about 115° F., adding to said dispersion a proteolytic enzyme which is active in alkaline or neutral solution, agitating said dispersion for between about one-half hour and 1 hour while maintaining said dispersion at a temperature suitable for enzyme activity and then heating said dispersion to inactivate said enzyme, said dispersion containing at least 30% casein.

4. A method of preparing adhesives comprising agitating and heating a mixture of casein and water in the presence of an alkaline compound until the temperature is raised to about 145° F. and a homogeneous dispersion of said casein is formed, cooling said dispersion to about 115° F. while agitating, adding to said cooled dispersion a solution of a proteolytic enzyme which is active in alkaline or neutral solution, mixing said enzyme and said dispersion for between about one-half hour and 1 hour to distribute said enzyme throughout said dispersion and cause it to act uniformly on said casein, heating said dispersion to inactivate said enzyme and cooling said dispersion.

5. A method of preparing adhesives comprising agitating a mixture of casein and water in the presence of an alkaline compound while heating to a temperature sufficiently high to produce a homogeneous dispersion containing at least 30% casein, cooling said dispersion to a temperature required for digestion thereof by a proteolytic enzyme that is active in alkaline or neutral solution, mixing with said dispersion a proteolytic enzyme which is active in an alkaline or neutral solution, agitating said dispersion while maintaining said dispersion at a temperature suitable for enzyme activity, and subsequently heating said dispersion to inactivate said enzyme.

6. A method of preparing adhesives comprising agitating a mixture of casein and water in the presence of an alkaline compound while heating the temperature sufficiently high to produce a homogeneous dispersion containing at least 30% casein, cooling said dispersion to the temperature required for digestion thereof by a proteolytic enzyme that is active in alkaline or neutral solution, mixing with said dispersion a proteolytic enzyme which is active in an alkaline or neutral solution, agitating said dispersion while maintaining said dispersion at a temperature suitable for enzyme activity, subsequently heating said dispersion to inactivate said enzyme, and mixing with said dispersion between about 5% and 50% of an undigested alkali dispersed casein.

SAMUEL M. WEISBERG.
EDWIN G. STIMPSON.

REFERENCES CITED

The following references are of record in the file of this patent:

UNITED STATES PATENTS

| Number | Name | Date |
|---|---|---|
| 2,246,983 | Oberg | June 24, 1941 |
| 2,217,264 | Weizmann | Oct. 8, 1940 |
| 750,832 | Dunham | Feb. 2, 1904 |

OTHER REFERENCES

Enzymes, Waksman and Davidson, Williams and Wilkins Co., Baltimore, 1926, page 209.